(12) United States Patent
Reinisch et al.

(10) Patent No.: US 6,698,293 B2
(45) Date of Patent: Mar. 2, 2004

(54) DRIVE TESTER AND TRANSMISSION TESTER

(75) Inventors: Hubert Reinisch, Freiberg (DE); Karl Baur, Kornwestheim (DE)

(73) Assignee: teamtechnik Maschinen und Anlagen GmbH, Freiberg (DE)

( * ) Notice: Subject to any disclaimer, the term of this patent is extended or adjusted under 35 U.S.C. 154(b) by 0 days.

(21) Appl. No.: 09/918,608

(22) Filed: Jul. 31, 2001

(65) Prior Publication Data

US 2002/0023483 A1 Feb. 28, 2002

(30) Foreign Application Priority Data

Aug. 1, 2000 (DE) ......................... 100 37 412

(51) Int. Cl.[7] .............................................. G01M 7/00
(52) U.S. Cl. ....................................................... 73/663
(58) Field of Search ................. 73/116, 117.2, 73/663

(56) References Cited

U.S. PATENT DOCUMENTS 4,356,724 A     11/1982  Ayoub et al.
4,466,294 A  *  8/1984   Bennington et al. ..... 73/862.13

FOREIGN PATENT DOCUMENTS

DE    39 05 983 A1    2/1989
DE    39 26 281 C2    8/1989
EP    02 52 246 A2    5/1987

OTHER PUBLICATIONS

J. Hermann and J. Timmers, "Gerauschuntersuchungen als Hilfsmittel der Fertigungskontrolle", Industrieanzeiger, Essen, 87. year, No. 17, Feb. 26, 1965.

Lexikon der Informatik und Datenverarbeitung, encyclopedia definition of "module", 3 pages.

* cited by examiner

*Primary Examiner*—Richard A. Moller
(74) *Attorney, Agent, or Firm*—Harness, Dickey & Pierce, P.L.C.

(57) ABSTRACT

The invention relates to a drive tester and transmission tester, preferably for carrying out acoustic, oscillation and functional tests, comprising a clamping device for clamping a specimen to be tested, preferably a transmission (90), a drive component or a driven component, e.g. an electric drive, a drive/transmission-integral solution or a transmission component, a driving device (44), at least one driven device (26), and a framework. The transmission tester according to the invention is wherein the framework is provided as frame modules independent of each other, wherein clamping device, driving device (44) and driven device (26) are each allocated to a frame module (20) for configuring a function module (central body module (18), driving module (12), driven module (14)).

14 Claims, 6 Drawing Sheets

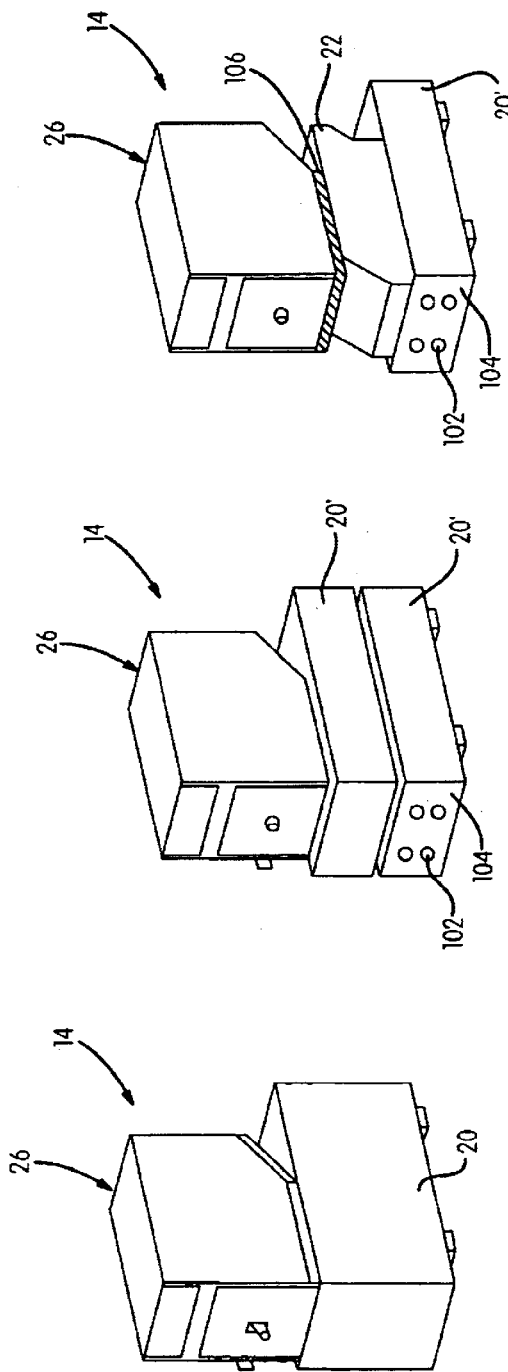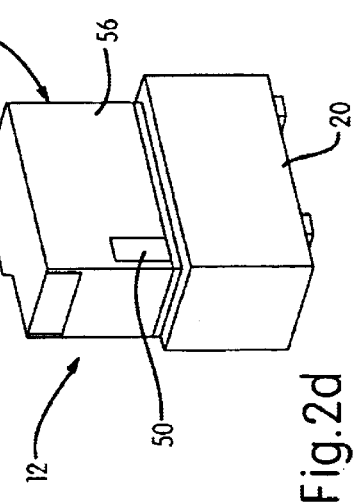

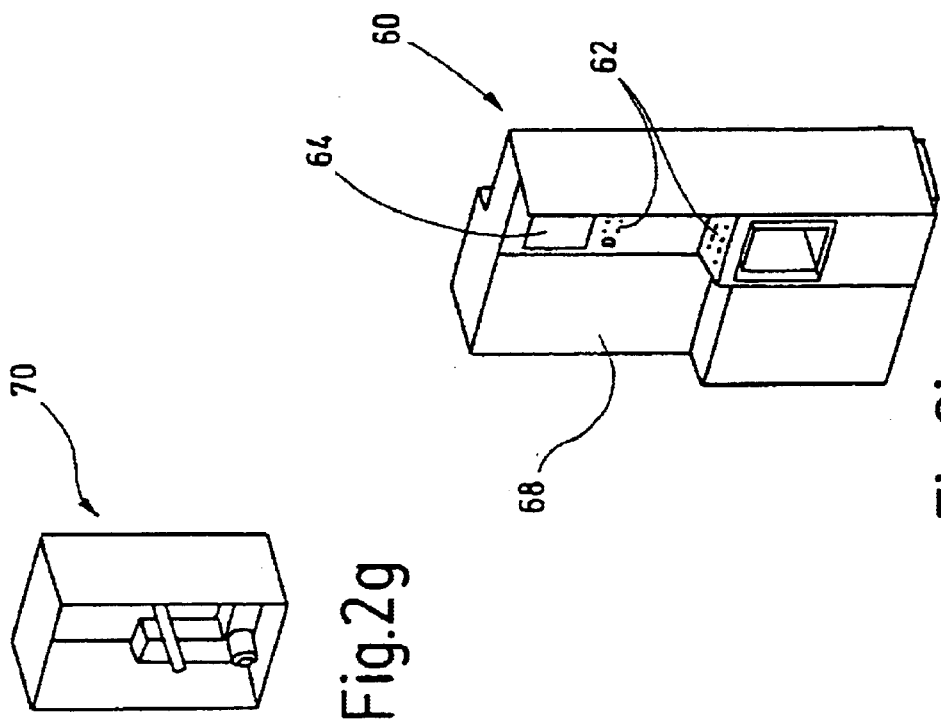
Fig.2i
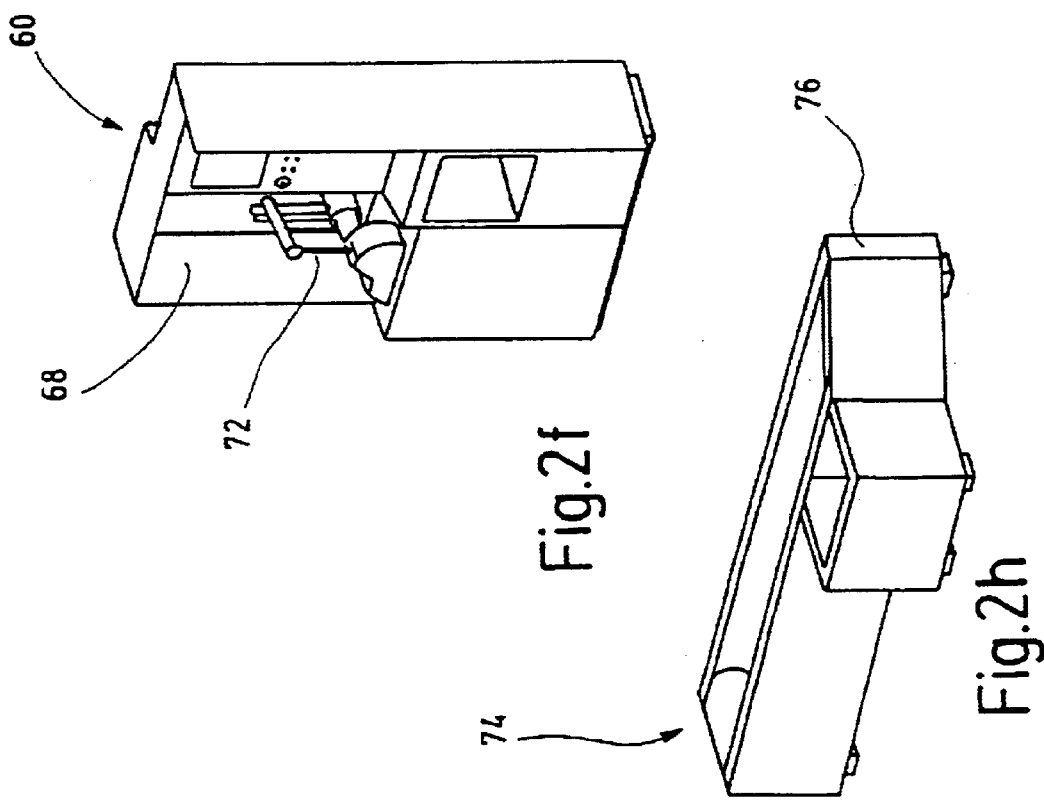
Fig.2g
Fig.2f
Fig.2h

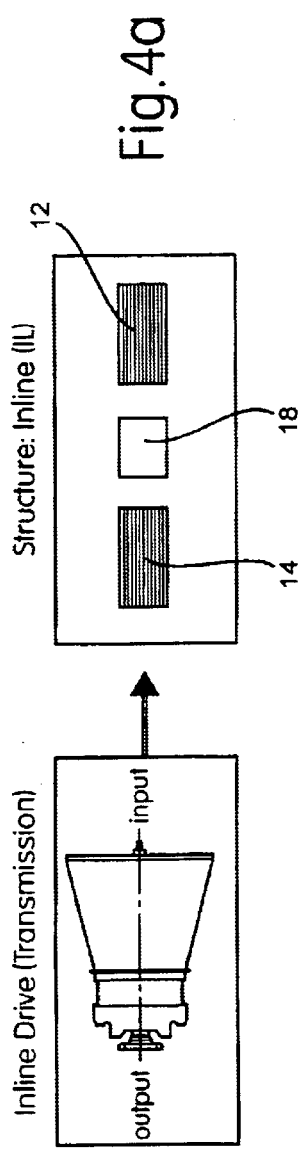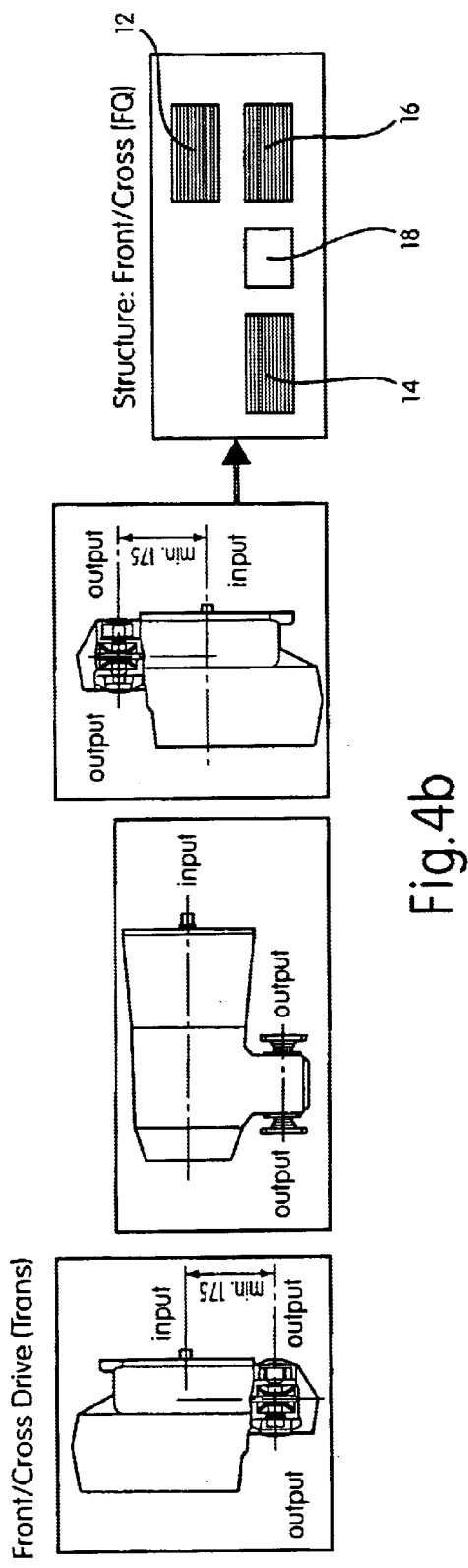

DRIVE TESTER AND TRANSMISSION TESTER

BACKGROUND OF THE INVENTION

1. Field of the Invention

The present invention relates to a drive tester and transmission tester, preferably for carrying out acoustic, oscillation and functional tests, comprising a clamping device for clamping a specimen to be tested, preferably a transmission, a drive component and a driven component, respectively, e.g. an electric drive, a drive/transmission-integral solution or a transmission component, a driving device, at least one driven device, and a framework.

2. Description of Related Prior Art

A transmission tester of the usual kind is e.g. known from publication DE 39 05 983 A1. The transmission tester described therein comprises a base frame that extends over the entire length of the transmission tester. The individual components of the transmission tester are arranged on this base frame. The clamping device for the transmission (specimen carrier) is located approximately centrally on the base frame and is located between a driving device and a driven device. Driving device and driven device may be, for example, coupled with the transmission via a shafting. The driving device or the driven device are, altogether, received on a respectively allocated slide, which is movable with respect to the clamping device for facilitating coupling and uncoupling of the respective shafting. The slides are driven by sliding motors that are supported at the base frame and act together e.g. with the respective slide by means of a spindle drive.

EP 02 52 246 A2 discloses a test device for drive units. Another test device for automobile gears is disclosed in DE 39 26 281 C2. Publication U.S. Pat. No. 4,356,724 discloses a transmission tester. The transmission tester disclosed therein comprises a frame and/or a basis, which carries both the driving unit and the driven unit.

The paper of J. Hermann and J. Timmers "Geräuschuntersuchungen als Hilfsmittel der Fertigungskontrolle", Industrieanzeiger, Essen, 87. year, No. 17, Feb. 26, 1965, relates to the investigation of noise development in transmissions, wherein the measurements were carried out at noise transmission testers for automobile transmissions.

A disadvantage of such transmission testers is that a rearrangement or a reconstruction for another type of transmission to be tested can be carried out—if at all—only with very much expense. Since the individual components of the transmission tester are provided on a common base frame, the flexibility is considerably restricted. In many cases, a rearrangement is only possible if the base frame is replaced, which does not only cause high costs, but also requires a lot of time.

One of the objects of the present invention is to improve the transmission tester of the kind mentioned before in such a way that in particular an easy reconstruction for another kind of transmission, another type of transmission and/or another drive component is possible.

SUMMARY OF THE INVENTION

The object of the invention is achieved for the transmission tester of the kind mentioned before in such a way that the frame is provided as frame modules, which are independent of each other, wherein clamping device, driving device and driven device are each allocated to a respective frame module for the configuration of a function module (central body module, driving module, driven module).

This means that the individual components of the transmission tester are not arranged on a common frame, but, rather, that the entire transmission tester is assembled of individual independent modules in a modular fashion. Such a modular assembly makes it possible to assemble the transmission tester as a modular system, wherein individual modules are configured in a transmission-nonspecific fashion and, thus, can be used for different kinds of transmission and different types of transmission. This has considerable advantages in view of the costs. In that way, not only the costs for a reconstruction of a transmission tester can be reduced, but also the costs for the transmission-nonspecific modules, as these can be manufactured in small series with a standardization degree. Loops of development, more detailed oscillation expenses/optimizations and calculation expenses/optimizations, optimization of software and hardware and continuous improvements of quality are, made possible in that way.

Besides the reduced manufacturing costs and reconstruction costs, also costs in maintenance can be saved, as a modular design can be maintained more easily. By re-using the modules, moreover, a resource protection is achieved.

Another advantage is that extremely short times of delivery can be realized due to the high degree of standardization and the many transmission-nonspecific components.

In an improvement of the invention, each frame module comprises means for connecting (connecting means) with another frame module. Preferably, the connecting means of the frame modules are arranged at predetermined (standardized) spots. It is particularly preferred if the connecting means are configured as flange connections.

These measures have the advantage that the individual frame modules can be connected to each other in a simple and, in particular, separable manner. In that way, it is always possible to replace a frame module by another frame module or, for example, to modify the arrangement of the individual frame modules, so that it can be adjusted to another transmission type. Flange connections have proved herein to be particularly simple and yet safe connections.

In a particularly preferred manner, at the central body module at least one driving module and one driven module are arranged in a detachable fashion. In a particularly preferred manner, the central body module is configured in a transmission-specific fashion and the other functional modules are configured substantially in a transmission-nonspecific fashion. This means that the transmission-nonspecific function modules can be used for several transmission types, whereas the transmission-specific central body module with the clamping device is adjusted to a specific type of transmission. If the transmission tester is adjusted to a new transmission, primarily, only the central body module with the clamping device has to be replaced, all other function modules can be further used by adaptation.

In an improvement of the invention, the driven device is arranged on its frame module in a displaceable fashion at least into one direction, preferably into three directions. In a particularly preferred manner, also the driven device is arranged on its frame module in a displaceable fashion at least into one direction, preferably into three directions. The driving device and/or the driven device are preferably mounted, respectively, on a slide unit for axial advance. It is particularly advantageous to provide the driven device on an independent adjustment module that can be mounted onto the frame module.

The measures mentioned before result in particular in short reconstruction times that can be reached by the displaceable arrangement and also in a reducible number of rotating components. The coupling of driven shafts at the specimen is carried out directly, i.e. without intermediate displacements, deviations or compensation shafts. The reduced number of rotating components has, in particular, the advantage that occurring unbalances can be prevented in a much simpler and more cost-effective manner. Expensive compensation shafts are herein not necessary. By the direct type of drive, the inertia of masses of the rotating parts is reduced and, thus, the acoustic, the characteristic vibrations, the dynamic and the standard quality are improved.

In a preferred improvement, a controlling and observing device for the configuration of a controlling module is provided on another frame module. Preferably, the controlling module comprises an operating device and a displaying device.

The continuation of the modular design is also advantageous with reference to the configuration of the controlling module, e.g. by the fact that replacing the operating device is possible in a very quick fashion. Furthermore, the controlling module can also be manufactured in a cost-effective manner.

For testing shift transmissions, the operating device comprises preferably a manual shift that is manually actuated. Preferably, the controlling module comprises a shift robot that actuates the manual shift during the test of a transmission. The controlling module comprises an insertion space for this shift robot module.

This has the advantage that the controlling module can always be reconstructed and without high expenses, by inserting a shift robot module into the insertion space provided.

In a preferred embodiment, a switch cabinet module is allocated at least to the driving module and to the driven module, respectively, wherein the switch cabinet module serves for electric supply and control of the respective function module. Preferably, a software module is allocated at least to the driving module and to the driven module, respectively, wherein the software module serves for operation control of the respective function module.

These measures result in a further consistent continuation of the modular design, not only on the mechanical construction side, but also on the electrical side and the program technical side. This modularity results in the function modules being self-sufficient, i.e. independent of other function modules. This has the advantage that the construction and/or the reconstruction of a transmission tester can be carried out in a simple and quick manner. Furthermore, the individual function modules can be tested and maintained independently of each other. This results in a considerable simplification of the maintenance of such drive testers and transmission testers.

In a preferred improvement, the driving device and/or the driven device are each surrounded by a sound insulation cabin in order to achieve sound insulation.

This has the advantage that the interference noise level can be considerably lowered, in particular for acoustic tests.

In a preferred embodiment, a measuring module is provided that comprises a measuring device and a frame module.

In a particularly preferred manner, a module for electrical control of the transmission to be tested (automatic transmission) is provided. Further preferred, a module for automatic loading of the clamping device with a transmission/transmission component to be tested is provided. In a particularly preferred manner, furthermore, a module for automatic oil filling of a transmission is provided.

These measures result in a further increase of the performance of the transmission tester, wherein the individual components are, again, constructed in a modular fashion in order to achieve the advantages already mentioned before. In particular, existing transmission testers can be enlarged in a simple and easy manner by the modules mentioned before.

It is to be understood that the features mentioned above and those yet to be explained below can be used not only in the respective combinations indicated, but also in other combinations or in isolation, without leaving the scope of the present invention.

Further advantages and embodiments of the invention can be taken from the description and the attached drawings.

BRIEF DESCRIPTION OF THE DRAWINGS

The invention will now be explained in more detail by means of embodiments and with reference to the attached drawings. In the drawings:

FIGS. 2a–i show schematic perspective representations of different modules of a transmission tester according to the invention;

FIGS. 4a–4e show graphic representations of different transmission tester structures.

DETAILED DESCRIPTION OF THE PREFERRED EMBODIMENT

Figure 1:
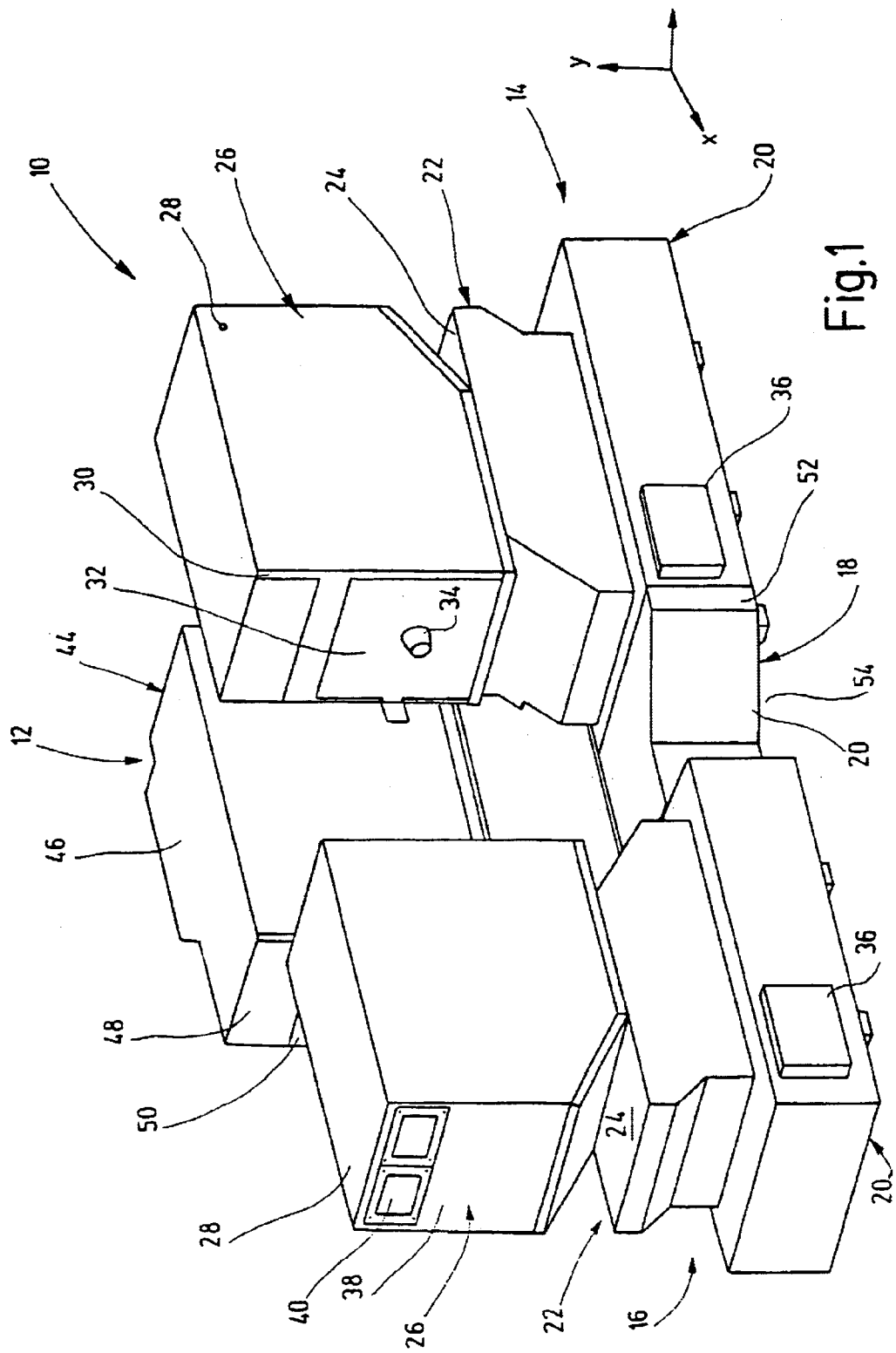
FIG. 1 shows a schematic perspective view of a modular transmission tester with the example of a front-transversal-structure.

In FIG. 1, a drive and transmission tester (shortly: transmission tester) is designated with the reference numeral 10. For the sake of distinctiveness, a schematic representation of this transmission tester 10 was used. Furthermore, the transmission to be tested was not drawn.

Transmission tester 10 comprises a driving module 12, as well as a first driven module 14 and a second driven module 16. Further, a so-called central body module 18 is provided. Around this central body module 18, two driven modules 14, 16 and driving module 12 are grouped and separately connected with central body module 18 via known flange connections. These flange connections are not shown in FIG. 1.

Driven module 14 comprises a frame module 20 that is shown, for the sake of simplicity, in an cuboid-shaped fashion in FIG. 1. Frame module 20, however, is usually constructed of different longitudinal supports and transverse supports, wherein individual supports are filled with polymer concrete.

Frame module 20 carries a very stiff adjusting module 22 that is represented also schematically only. This adjusting module 22 allows, together with an adjustment slide unit, a displacement of upper surface 24 in X-direction, Y-direction and Z-direction. The displacement of this surface 24 may be realized in different ways, e.g. by motor operators or hydraulic cylinders.

On surface 24, a driven device 26 is provided. This driven device 26 comprises a housing 28 that receives an electric machine (motor, generator; not shown in FIG. 1). In order to achieve a displaceability of driven device 26 into X-direction (advance direction), the slide unit is provided, on which adjusting module 22 is arranged. The slide unit is connected with adjusting module 22 and, for the sake of distinctiveness, not shown in FIG. 1.

At front surface 30 of housing 28, a plate 32 is provided through which a schematically indicated driven shaft 34 can enter, in order to generate a connection between specimen, e.g. transmission, and electric machine.

Driven module 14 further comprises a switch cabinet module that is schematically shown in FIG. 1 and is designated with the reference numeral 36. In the present embodiment, switch cabinet module 36 is connected with frame module 20. Switch cabinet module 36 comprises the entire decentralized electric part for the operation of driven module 14.

Second driven module 16 is assembled in the same way as driven module 14 that was already explained, so that, for the sake of simplicity, same parts are designated with same reference numerals. For this reason, a repeated description is omitted.

At rear side 38 of housing 28 of second driven module 16, two openings 40 are shown that serve for ventilation of the electric machine accommodated in housing 28.

In FIG. 1, for the sake of distinctiveness, it is not shown that, optionally, a sound insulation cabin can be provided that completely surrounds driven device 26 and adjusting module 22 in order to achieve a sound insulation. Such a sound insulation cabin can, of course, also be provided for driven module 14 or for driving module 12.

In the background, covered by the two driven modules 14 and 16, driving module 12 is arranged that comprises a similar assembly as the two driven modules 14, 16. Driving module 12 also comprises a frame module 20, onto which, if necessary, an adjusting module can be provided. On the frame module or on the adjusting module, again, rests a driving device 44 that comprises a housing 46 and an electric motor (not shown) accommodated in that housing 46. Also driving module 22 comprises a switch cabinet module 36 that is also mounted on frame module 20.

Central body module 18 also comprises a frame module 20 and, if necessary, a clamping device that is, however, not shown in FIG. 1 for the sake of distinctiveness. This clamping device serves for fastening the specimen, e.g. the transmission or a transmission component.

Frame module 20 of central body module 18 has at its front side 52 a recess cut 54. This recess cut 54 is to facilitate the placing and the displacing of the transmission out of the clamping device from front side 52.

In the assembly of the transmission tester shown in FIG. 1, two driven modules 14, 16 are in a line and at both sides of central body module 18. Driving module 12 is at the rear side of central body module 18, wherein a drive shaft or a drive belt runs vertically to driven shafts 34.

For a detachable fastening of frame modules 20 onto frame module 20 of central body module 18, connecting means are, respectively, provided at predetermined locations around each frame module 20 (into circumferential direction). In that way, it shall be guaranteed that e.g. driving module 12 and driven module 14 can be arranged according to a modified structure (cf. FIG. 4).

At the rear side of transmission tester 10, a measuring device is arranged that is, however, not shown in FIG. 1. This measuring device is also arranged on a frame module 20. The measuring device can e.g. comprise sensors for the noise measuring of a transmission.

As the basic function of such a transmission tester is generally known, it shall not be explained in more detail. The function of present transmission tester 10 does not differ from the function of common transmission testers.

In FIG. 2, different modules of transmission tester 10 are shown, wherein, for the matter of simplicity, the same reference numerals are used for the same components.

In FIG. 2a, a driven module 14 is shown that comprises a frame module 20 and a driven device 26. Different from the embodiment shown in FIG. 1, adjusting module 22 was omitted and, instead, frame module 20 was suitably enlarged in its height (double construction height).

In this embodiment, driven device 26 is merely displaceable (advanceable) into one direction, namely in X-direction. A possibility of adjusting in Y-direction and in Z-direction is omitted.

In FIG. 2b, also a driven module 14 is shown that substantially corresponds to the one shown in FIG. 2a. The only difference is that frame module 20 enlarged in Y-direction is provided in the form of two frame sub-modules 20'.

This has the advantage that a reconstruction to the solution shown in FIG. 2c is possible in a very simple manner. To this end, merely the upper frame sub-module 20' needs to be replaced by adjusting module 22 that has been already explained.

In FIG. 2d, driving module 12 is shown that comprises driving device 44 and frame module 20. Frame module is—like in FIG. 2a—also configured in double construction height. Of course, this frame module 20 can also be configured in the form of two frame sub-modules 20' or with a frame module 20 and with an adjusting module 22. Driving device 44 comprises housing 46 that comprises at a side wall 56 the opening 50, through which runs a drive shaft or a drive belt. Of course, this opening 50 can also be arranged at a front surface of housing 46.

In FIG. 2e, central body module 18 is shown without clamping device. Frame module 20 has, in top view, the rectangle form that was already described, wherein at the front side a recess cut 54 is provided. This central body module 18 is configured in a transmission-specific manner due to the clamping device. The other modules of transmission tester 10 are, in contrast, mainly configured in a transmission-nonspecific manner. The clamping device and central body module 18 are, however, always adapted to the transmission to be tested.

In FIG. 2e, a module for controlling and monitoring 60 is shown that has not been drawn in FIG. 1 for the sake of distinctiveness. This module for controlling and monitoring 60 (in the following shortly called module for controlling) is arranged at front side 52 of central body module 18.

Module for controlling 60 comprises an operating device 62 and a displaying device 64. Displaying device 64, e.g. in the form of a flat screen, serves for displaying the measuring results and the operating condition of the transmission tester. Operating device 62 serves for adjusting certain parameters of the individual modules of the transmission tester and of the control of the testing procedure.

Module for controlling 60 comprises an insertion space 68 that is covered by a cover plate in FIG. 2e. Into this insertion space 68, a shift robot module 70 can be inserted in order to carry out automatically transmission shifts in a shift transmission. Shift robot module 70 is shown in FIG. 2g, while module for controlling 60 with inserted shift robot module 70 is shown in FIG. 2f. A gear shift lever 72 that is moved by the shift robot can be clearly seen.

Finally, in FIG. 2h, a loading module 74 is shown that is inserted with a front side 76 into recess cut 54 of central body module 18. The front section of loading module 74 is, consequently, adapted to the form of recess cut 54 of central body module 18. By means of this loading module 74, it is possible to place transmissions automatically into the transmission tester and to transport same out again of the transmission tester.

By means of the individual modules of the transmission tester shown in FIG. 2, it is shown that a modular system was created that allows a very flexible assembly of a transmission tester. Furthermore, the individual modules can always be separated from central body module 18 and can be used e.g. in other transmission testers of the same or of different configuration.

In FIGS. 4a through 4e, some examples are shown how a transmission tester can be assembled for different kinds of transmission by means of the modules shown in FIG. 2. For example, in FIG. 4a a transmission tester is assembled that serves for testing a so-called inline-transmission. To this end, a driven module and a driving module are arranged in a line, wherein central body module 18 is located between the two other modules.

In FIG. 4b, the transmission tester comprises two driven modules 14, 16 being located in a line and a driving module 12 being located in parallel to a driven module 16. Central body module 18 is located between the two driven modules 14, 16. This transmission tester allows the test of a front-transversal-transmission.

Figure 4C:
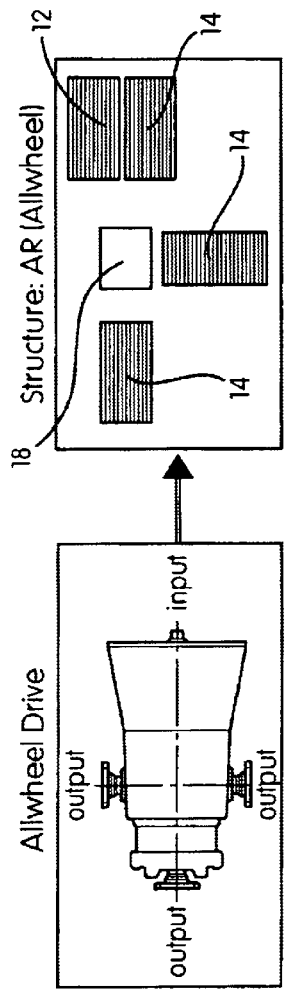

A four wheel transmission is tested with the structure of a transmission tester shown in FIG. 4c. Three driven modules 14, 16 and one driving module 12 are used altogether herein.

Figure 4D:
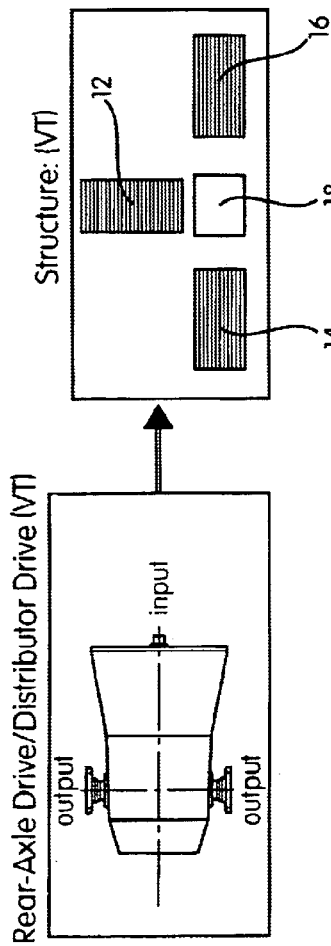

In FIG. 4d, a transmission tester with two driven modules 14, 16 and one driving module 12 is provided in order to be able to test a rear-axle transmission/transfer gear-box.

Figure 4E:
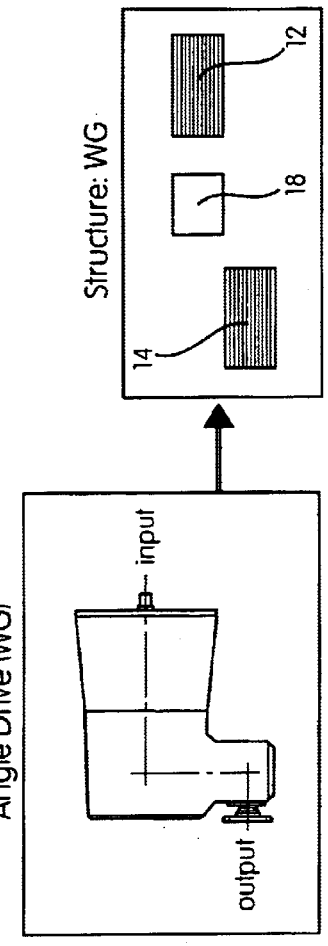

Finally, in FIG. 4e, the structure of a transmission tester for testing an angular transmission is shown, wherein driven module 14 and driving module 12 are located on parallel lines that are displaced to each other.

From this short and not complete listing of different examples of transmission tester structures, it can be seen that the modular system mentioned before allows many different transmission testers, without that specially adapted frames, driven devices or driving devices or the like would be necessary to this end. For all the transmission testers shown, merely central body module 18 and the clamping device need to be adapted to the respective transmission. All other modules remain unchanged with reference to their assembly.

Figure 3:
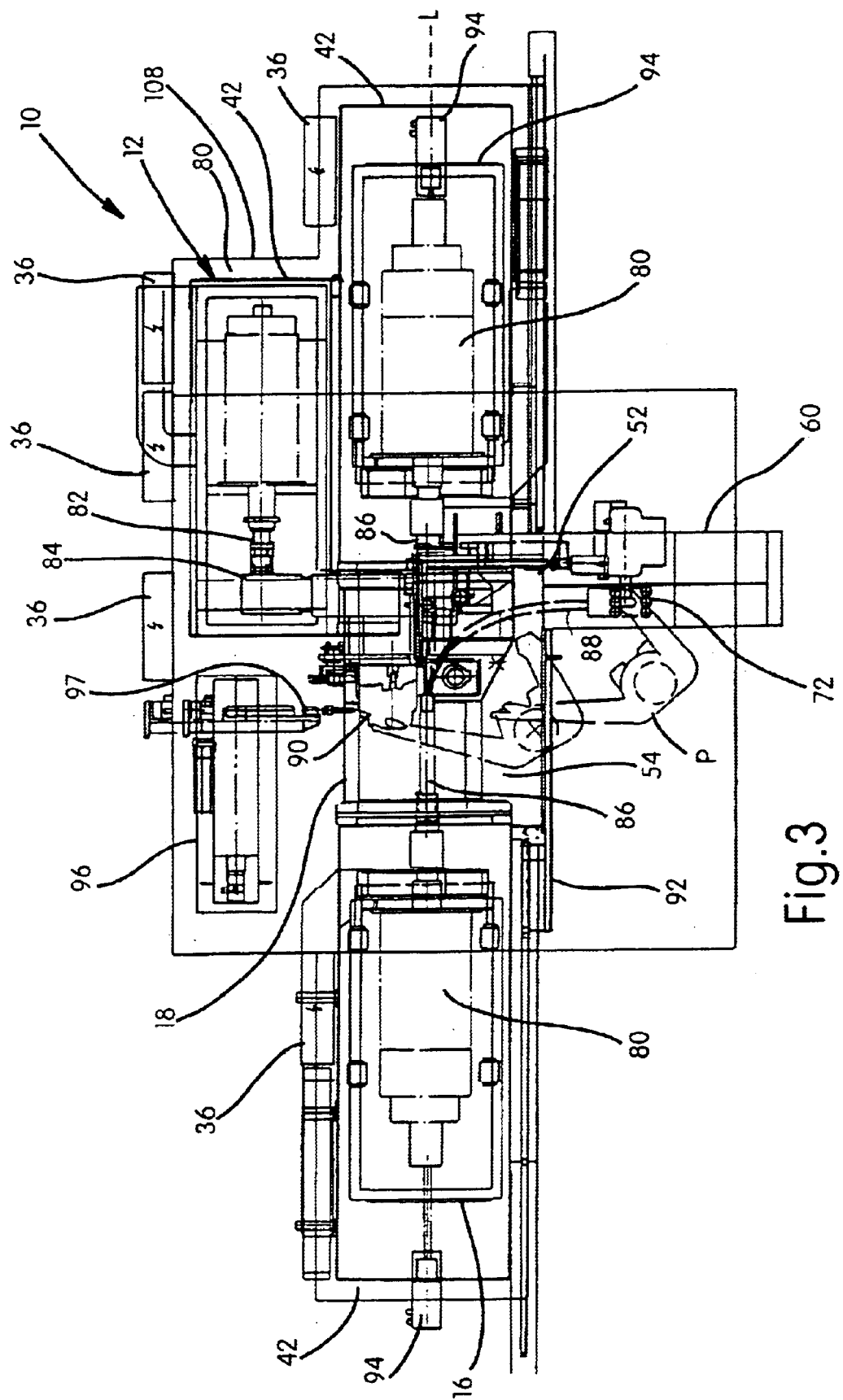
FIG. 3 shows a schematic top view of a transmission tester according to the invention with the example of a front-transversal-structure.

In FIG. 3, transmission tester 10 is shown in top view, wherein a front-transversal-structure is only exemplary shown. Herein, for the sake of simplicity, again, the same parts already shown are also designated with the same reference numeral. A repeated description thereof shall, for this reason, be omitted.

FIG. 3 shows the electric motors 80 that are provided in the driven devices and/or in the driving devices. Electric motor 80 of driving device 12 serves for the transmission of rotary energy onto the transmission to be tested that is designated with the reference numeral 90. This transmission 90 is clamped in a clamping device on central body module 18. The rotary energy is transmitted via a very short drive shaft 82 and a belt 84 that runs transversely thereto onto the driving side of transmission 90.

On the driven side, transmission 90 is coupled with a respective driven shaft 86, each of which extends to electric motors 80 of driven devices 26. The two electric motors 80 of driven devices 26 serve for receiving energy and, in particular, for simulating a load. Since, in the present embodiment, two driven devices 26 are provided, the loads applied onto both driven sides of transmission 90 can be applied in an unsymmetrical manner (e.g. in curve rides). All electric motors can be operated in 4-quadrants-operation (traction-/thrust load situations and unsymmetrical load situations). In that manner, for example, the engine and the wheel loads of a vehicle are reproduced and applied onto the specimen.

FIG. 3 shows further module for controlling 60 that is arranged at front side 52 of central body module 18 and extends transversely to longitudinal axis L of the transmission tester. Module for controlling 60 comprises a gear shift lever 72 that is operated by an operating person P. This operation is transmitted onto transmission 90 via cable controls 88.

In the top view, moreover, sound insulation cabins 42 can be recognized which surround the individual modules.

In the handling area of operating person P, a sliding door 92 is provided that is able to shield the region of recess cut 54 outwardly. After the testing run is finished, sliding door 92 is opened, and operating person P can enter this inner area in order to dismount transmission 90 and e.g. to lift it out of transmission tester 10 via a crane (when the load is not automized).

As already mentioned before, driven devices 26 are arranged in a displaceable fashion on a slide. This slide is, respectively, driven by a motor operator that is designated with the reference numeral 94 in FIG. 3.

Also in FIG. 3, a measuring device 96 is shown that comprises a measuring sensor 97 being adjacent to transmission 90 for measuring. This measuring sensor 97 serves for measuring noises.

All information that is relevant from the measuring and the controlling point of view is supplied to computer 66 of module for controlling 60 e.g. via a field bus. The data are recorded and suitably evaluated. The structure of the software is also orientated at the modular concept of the transmission tester and is, thus, also divided in individual software modules.

After all, one can see that the "modular system" according to the invention that comprises different modules allows a very flexible design of a transmission tester. In particular, existing transmission testers can be quickly reconstructed without that—as before—considerable rearrangement measures had to be taken in the area of the framework. The modularity of the individual components of the transmission tester facilitates, additionally, the test and the maintenance of the components and allows the manufacture of individual modules in small series. This results in considerable cost reduction in manufacture.

It is to be understood that the embodiment described has a purely exemplary character and that the invention is not limited thereto. For example, those skilled in the art know, without any problems, different solutions for achieving the adjustability of the driven devices. This holds also true for the purely schematically shown assembly of the frame modules. Furthermore, also driving components, like electric motors, etc. can be tested in the tester shown. The tester is, thus, not limited to testing transmissions.

Further applications are the tests of functions, oscillations, performance and/or acoustics of components and particularly of electric drives of new innovative drive technologies, also in co-acting with output request and negative feed of energy of/to electric sources of energy or (intermediate) storage (fuel cells, batteries, accumulators, etc.). The tests can be carried out by simulating and applying real load situations.

What is claimed is:

1. A modular drive and transmission tester, preferably for conducting acoustic, oscillation and functional tests, comprising:

a first frame module for supporting the device such as a transmission to be tested;

a second frame module for supporting a driving component such as an electric motor;

a third frame module for supporting a driven component such as a load;

connection means for mechanically securing in a detachable manner said first frame module to said second and third frame modules; and coupling means for operatively coupling said driving and driven components to said tested device.

2. The drive and transmission tester of claim 1, wherein each frame module includes connecting means for connecting with another frame module.

3. The drive and transmission tester of claim 2, wherein the connecting means of each frame module are arranged at predetermined locations in a standardized manner to permit the frame modules to be joined in multiple configurations.

4. The drive and transmission tester of claim 3, wherein the connecting means of each frame module are configured as flange connections.

5. The drive and transmission tester of claim 1, wherein the first frame module is configured in a transmission-specific fashion and the second and third frame modules are configured substantially in a transmission-nonspecific fashion.

6. The drive and transmission tester of claim 1, wherein the frame modules comprise frame parts which are filled with polymer concrete.

7. The drive and transmission tester of claim 1, wherein either of the driving component or driven component is arranged on its respective module in a displaceable fashion in at least one direction.

8. The drive and transmission tester of claim 1, wherein either of the driving component or driven component is arranged on its respective module in a displaceable fashion in at least two directions.

9. The drive and transmission tester of claim 8, wherein the frame modules for either of the driving component or driven component include a slide unit for mounting the component to the frame.

10. The drive and transmission tester of claim 1, further including a fourth frame module for supporting a controlling device for controlling the operation of the tested device.

11. The drive and transmission tester of claim 10, wherein the controlling device comprises an operating device and a displaying device.

12. The drive and transmission tester of claim 11, wherein the operating device comprises a robotic manual shift mechanism for operating the tested transmission.

13. The drive and transmission tester of claim 1, wherein either of the driving component or driven component is surrounded by a sound insulation cabin.

14. The drive and transmission tester of claim 1, further including a fifth frame module for supporting an electrical control for the tested transmission.

* * * * *